Aug. 14, 1962         C. J. FLETCHER                3,049,320
                    ANNULAR WING AIRCRAFT
Filed July 11, 1958                          3 Sheets-Sheet 1
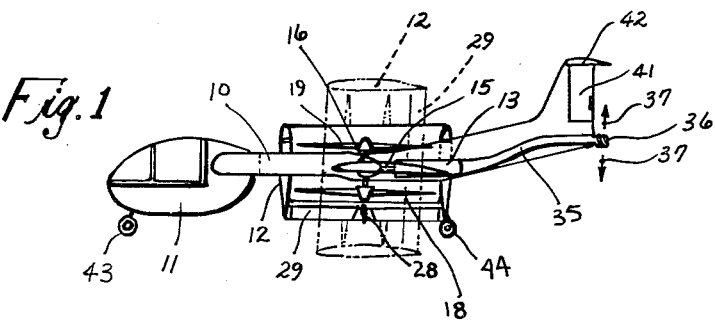
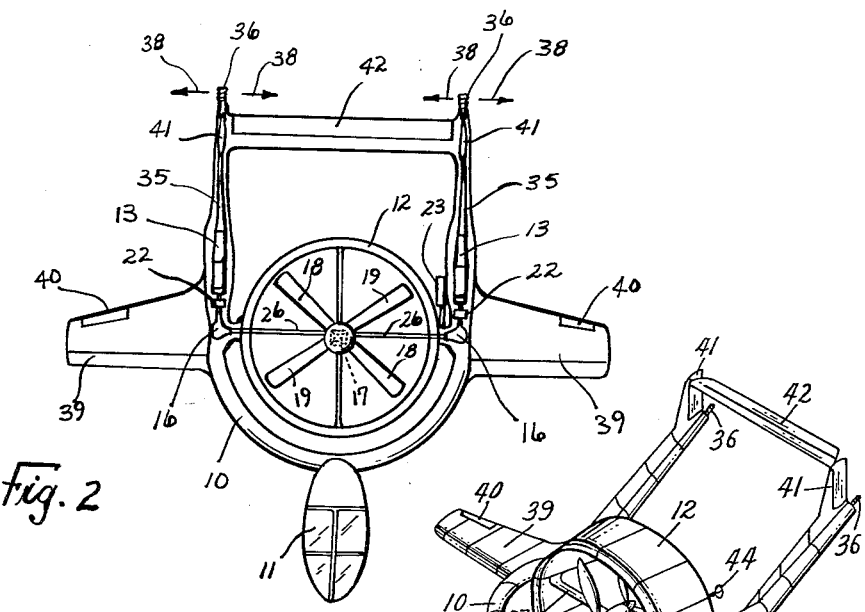
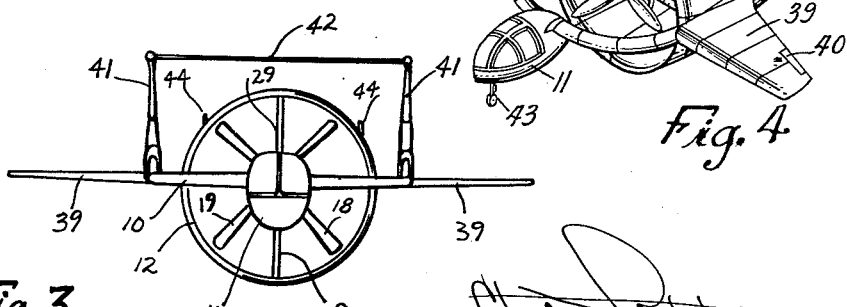
INVENTOR.
BY Aug. 14, 1962

C. J. FLETCHER 3,049,320

ANNULAR WING AIRCRAFT

Filed July 11, 1958

Charles J. Fletcher — INVENTOR.

BY

Aug. 14, 1962     C. J. FLETCHER     3,049,320
ANNULAR WING AIRCRAFT

Filed July 11, 1958     3 Sheets-Sheet 3

INVENTOR.

BY

3,049,320
ANNULAR WING AIRCRAFT
Charles J. Fletcher, Sparta, N.J.
Filed July 11, 1958, Ser. No. 747,874
5 Claims. (Cl. 244—12)

This invention relates to improvements for a vertical rising aircraft of the annular wing type.

Heretofore, various devices have been provided for annular wing aircraft designed to accomodate a pilot standing on an annular platform wing.

Still other types provide for an annular wing fixed to the fuselage which requires the pilot and passengers to pivot through an arc of approximately ninety degrees during translation from vertical to horizontal flight.

In either of the above cases no arrangement is provided wherein the annular wing pivots within a semi-circular twin boom or U-shaped fuselage to provide a compact system to accomplish vertical flight as a helicopter or high speed flight as a conventional aircraft.

The principal object of this invention therefore is to provide a unique annular wing type aircraft of new and novel arrangements embodying interconnecting moving or stationary parts, wherein the fuselage is of the twin boom substantially semi-circular at one end and carrying a pivotally mounted annular wing ducted propeller combination mounted within for accomplishing both vertical and horizontal flight.

Another object of this invention is to permit the conversion from vertical to horizontal flight without subjecting the pilot to a rotating motion.

Still another object of this invention is to provide an aircraft having a fixed power system within the twin boom fuselage capable of driving a rotor system which pivots in unity with an annular type wing.

Another object of this invention is to provide for an aircraft comprising a pivotally mounted annular wing, ducted propeller combination which provides for a minimum center of gravity travel during translation from vertical to horizontal flight.

Another object of this invention is to provide for a more responsive aircraft by controlling the pivotally mounted annular wing, ducted fan combination in such a manner as to direct the generated thrust forces in the direction best suited for a given flight condition.

Still another object of this invention is to provide an aircraft of greater strength to weight ratio by use of circular shaped structures.

Another object of this invention is to provide for an aircraft having a greater thrust to weight ratio by utilizing the ducted propeller principle.

Still another object of this invention is to provide for an aircraft wherein the resultant thrust force generated by the annular wing ducted propeller combination passes through a point substantially close to the aircraft center of gravity regardless of the position of the annular wing.

Still another object of this invention is to provide for an aircraft, wherein the center of pressure of the annular wing and the center of gravity of the aircraft lie substantially in a plane transverse to the longitudinal axis of said aircraft when the wing is in the horizontal or forward flight position.

Still another object of this invention is to provide for an aircraft having twin engine reliability.

Still another object of this invention is to provide for an aircraft which in general will be simple, inexpensive and of rugged construction to minimize initial cost and maintenance.

Still another object of this invention is to provide for an aircraft that can operate safety in and out of extremely confined areas.

Still another object of this invention is to provide for an aircraft that will be inherently stable and therefore easy to fly with relatively little training.

Still another object of this invention is to provide for an aircraft comprising a pivotally mounted annular wing, ducted propeller combination, wherein the annular wing and propeller drive system pivots about a common axis.

Still another object of this invention is to provide for a ducted fan arrangement which can be rotated in a simple manner from the vertical flight position to the forward flight position.

Still another object of this invention is to provide for a ducted fan annular wing combination which is pivotally mounted within the span of the twin boom fuselage.

Still another object of this invention is to provide for an aircraft having helicopter capabilities in vertical flight and have the capability of fighter aircraft performance in forward flight.

Another object of this invention is to provide an aircraft combining the ducted fan, annular wing arrangement with a fixed conventional wing to substain the weight of the aircraft during higher forward speed flight.

Another object of this invention is to provide an aircraft having a power source which utilizes the exhaust gases at the end of the fuselage boom for control jets.

These and other objects of the invention will be apparent by referring to the following specifications and accompanying drawings, wherein:

FIGURE 1 shows a side view of the aircraft with the annular wing positioned in the vertical flight position.

FIGURE 2 shows a top view of the aircraft with the annular wing positoned in the vertical flight position.

FIGURE 3 shows a front view of the aircraft with the annular wing in the forward flight position.

FIGURE 4 shows a three-quarter perspective view of the aircraft with the annular wing in the vertical flight position.

Figure 5:
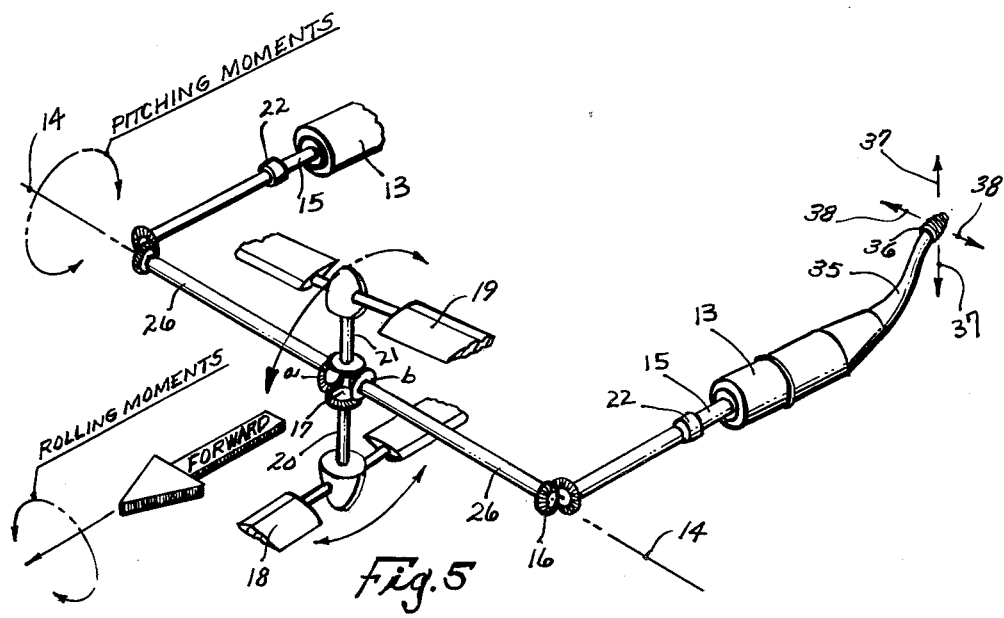
FIGURE 5 shows a typical power plant and drive system.

Referring more particularly to the drawings wherein similar reference characters designate like parts throughout the several views, a fuselage 10 is shown of substantially semi-circular shaped, twin boom construction including a passenger pod 11 attached to the forward end. Attached inward with respect to the twin boom fuselage is a pivotally mounted annular wing 12.

Figure 6:
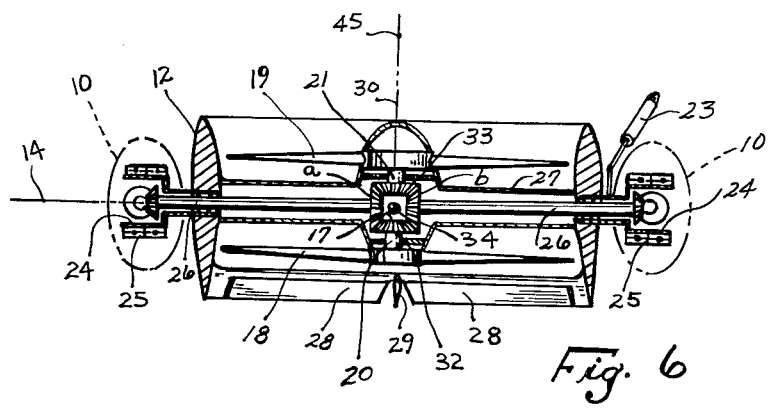
FIGURE 6 shows a cross sectional view through the annular wing depicting the rotor drive system shown in FIGURE 5.

The distribution of the working components are best illustrated in FIGURES 5 and 6, wherein two power plants 13 are laterally disposed within the twin boom fuselage 10 and disposed rearward of the annular wing 12 pivoting axis 14. The drive shafts 15 of each power plant 13 extends forward to the pivot axis 14 and drives a right angle transmission 16 which in turn couples shafts 26 that extend inward to the central portion of the annular wing 12. The inboard ends of shafts 26 drives a pivotally operated transmission 17 which in turn couples a pair of counter-rotating rotors 18 and 19, by means of their respective rotor shafts 20 and 21. Drive shaft clutches 22 are positioned at an intermediate point between the power plant 13 and transmission 16 to permit single power plant operation in the event of a power failure. Clutches 22 are of the overriding type and are designed to uncouple automatically when powerplant 13 failure occurs or when the powerplant 13 is shutdown from operation by conventional controls which are pilot actuated.

The annular wing 12 is provided with an actuator 23 which is pilot actuated and operable by means of such conventional aircraft power systems as hydraulic, electrical, and/or mechanical as specific design criteria may dictate. Also, the actuator 23 is mounted to the twin boom fuselage 10 which enables the pilot (not shown) to change the relationship of the wing 12 (including the rotor system) with respect to the twin boom fuselage 10 about pivot axis 14 for converting the aircraft from vertical to forward flight and for other purposes hereinafter described.

Referring now to FIGURE 6, the annular wing 12 is provided with fixedly mounted hollow shafts 24 which are in turn mounted on bearing assemblies 25 housed within the twin boom envelope 10 (shown in phantom line). In order to permit the annular wing 12 to pivot from a flying position to a landing position in unity with the transmission 17, drive shafts 26 and hollow shafts 24 have a common pivot axis 14 which is co-axial with respect to the lateral gears (a) and (b) rotating axis of transmission 17. Struts 27 and rotor housing 31, supports the transmission 17 on bearings 32 and 33 so that the rotor axis of symmetry 30 is co-axial with the wing axis of symmetry 45.

In order for the aircraft to achieve a higher degree of stability during vertical and transitional flight, a pair of control surfaces 28 and 29 which are pilot actuated by conventionl flying controls, are provided at the trailing edge of annular wing 12. Control surfaces 28 and 29 are intended to operate in unity with annular wing tilt by means of a typical mechanical system described in my previous patent application for an annular wing aircraft, Serial No. 526,144. Control surface 28 is radially aligned with respect to the axis of symmetry of annular wing 12 and parallel with respect to the lateral axis 14. By deflecting control surface 28 in a fore and aft manner, the air stream generated by the counter-rotating propeller 18 and 19 will cause pitching moments to generate about lateral axis 14 which represents the approximate vertical location of the aircraft center of gravity 34. Deflection of control surface 29 in a lateral manner will cause by similar means rolling moments about the longitudinal axis designated by the "forward" arrow shown in FIGURE 5.

In order to provide for a secondary means of control about the aircraft pitching and rolling axis shown in FIGURE 5, the exhaust gases from power plant 13 are utilized by transporting the gases through the fuselage boom tail conduit 35 to exhaust control nozzle 36, where the gases are expended to atmosphere in one of the directions shown by arrows 37 for creating controlling pitching moments about axis 14, or in one of the directions shown by arrows 38, for creating controlling yaw moments about the aircraft vertical axis. The exhaust control nozzle 36 basically would comprise a series of deflector vanes (not shown) operable by the pilot by conventional flying controls which permits the exhaust gases to be discharged in a given direction to achieve a desirable flight attitude.

Once the aircraft has achieved full transition by rotating annular wing 12 to the forward flight position, fixed wings 39 are provided to supplement the partial lift provided by the annular wing 12. During forward flight, aerodynamic control is provided about the three principal axes by ailerons 40 positioned at the trailing edge tip portion of fixed wing 39, and rudders 41 and stabilizer 42 mounted at the rearward end of twin boom fuselage 10.

For purposes of clarity, all aerodynamic and exhaust gas flight controls of the foregoing description are interconnected to conventional flying controls such as stick and rudder combination (not shown) in order to permit each independent system to function effectively during a given flight condition between vertical, transitional, and forward flight.

A nose wheel 43 is provided at the forward end of passenger pod 11 and rear wheels 44 are mounted off the trailing edge portion of annular wing 12, thus providing for a tricycle landing gear arrangement.

Figure 7:
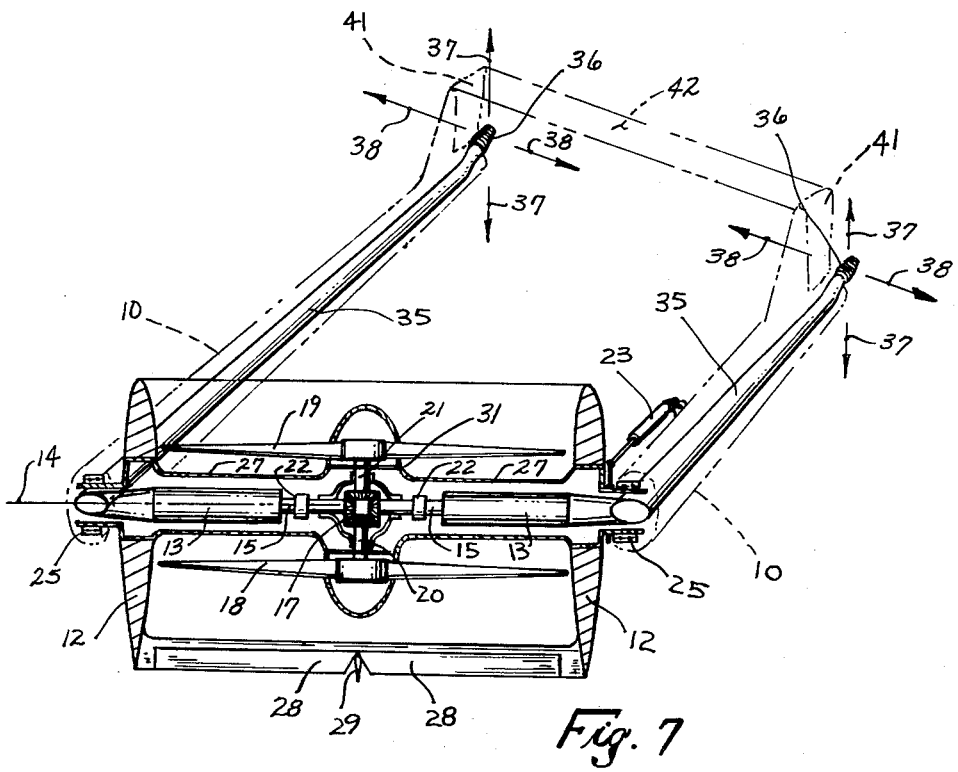
FIGURE 7 shows a cross section view of a second embodiment with a power plant and drive system housed within an annular wing including a perspective view of the tail boom exhaust gas conduit and control jet.

A second embodiment power arrangement is shown in FIGURE 7 wherein the cross section of the annular wing 12 shows two laterally disposed power plants 13 fixedly mounted on the annular wing pivot axis 14. The drive shafts 15 of each power plant 13 extends inward to the central portion of the wing 12 and drives a pivotally operated transmission 17 which in turn couples a pair of counter-rotating rotors 18 and 19 by means of co-axial rotor shafts 20 and 21. Drive shaft clutches 22 operating in the same manner previously described for the aircraft shown in FIGURES 5 and 6 are positioned at an intermediate point between the power plant 13 and transmission 17 to permit single power plant operation in the event of an engine failure.

Struts 27 are fixedly mounted between the annular wing 12 and housing 31 thus enabling the latter components to rotate in unity on bearing assembly 25 during conversion from vertical to forward flight. The power plant 13 is fixedly mounted at the outboard (exhaust) end to the fuselage boom 10 and therefore remains in a stationary position with respect to the annular wing 12 during rotation from vertical to horizontal flight. Gases from the power plant 13 are directed through a right angle turn at the fuselage boom 10 and as described in the first embodiment shown in FIGURES 5 and 6. The exhaust gases are further transported through fuselage boom exhaust conduit 35 to the exhaust control 36 operable by deflector vanes described above for FIGURE 7 and pilot actuated by conventional flying controls for providing either pitch or yaw controlling moments at the discretion of the pilot (not shown) and as shown by arrows 37 and 38 respectively.

Figure 8:
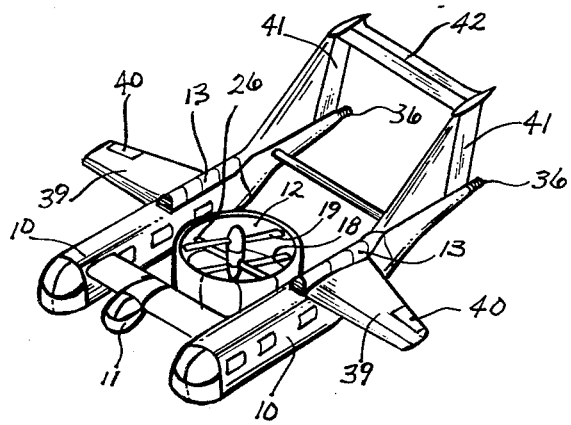
FIGURE 8 shows a third embodiment with the twin boom fuselage modified to accommodate passengers or cargo.

Referring now to FIGURE 8, a third embodiment provides for a boom-type fuselage 10 designed specifically for accommodating both passengers and cargo. Annular wing 12 is pivotally mounted and operably connected between the twin boom fuselage 10, and provides a power system similar to the arrangement described herein and shown in FIGURES 5 and 6.

What I claim is:

1. An aircraft comprising a substantially U shaped fuselage, a tubular wing pivotally mounted on and centrally located within said fuselage, a thrust generating means housed within said wing for creating a blast of air therethrough, and power means associated with said aircraft for operating said thrust generating means, and means operably interconnecting the fuselage and the wing for moving the chordwise axis of symmetry of said wing from a vertical to a horizontal position.

2. An aircraft comprising a U shaped fuselage, a tubular wing pivotally mounted on and positioned between the laterally disposed halves of said fuselage, a rotor operatively mounted within said wing for creating a blast of air therethrough, and power means associated with said aircraft for driving said rotor, said wing and said rotor being pivotally mounted with respect to said fuselage on a common pivot axis and said pivot axis being disposed transversely to the chordwise axis of symmetry of said wing, whereby said wing and said rotor may pivot as a unit with respect to said fuselage about said common axis.

3. An aircraft comprising a fuselage substantially U shaped, an annular wing pivotally mounted on and positioned between the laterally disposed halves of said fuselage, a power means associated with said aircraft and operably connected to a thrust generating means positioned within said wing, means operably interconnecting the fuselage and wing for changing the thrust axis of said thrust generating means in unity with said wing with respect to said fuselage from a vertical position to a horizontal position.

4. In an aircraft, a wing structure comprising transversely spaced airfoil sections, a supporting member fixedly securing said sections to one another and an annular wing section positioned between the laterally disposed halves of said member and pivotally carried thereon, said airfoil sections and said annular wing section being so spaced longitudinally that their center of pressure lies substantially in a plane transverse to the longitudinal axis of said aircraft when said annular wing section is positioned in the forward flight position.

5. In an aircraft, a wing structure comprising transversely spaced airfoil sections, a supporting member fixedly securing said sections to one another and an annular wing section positioned between the laterally disposed halves of said member and pivotally carried thereon, a passenger pod fixedly positioned on the forward end of said member and control means in said pod operably connected to said annular wing section whereby said annular wing section may be pivoted from a vertical flight position to a forward flight position, said member comprising a pair of fuselages each capable of housing cargo or personnel within.

References Cited in the file of this patent

UNITED STATES PATENTS

| | | |
|---|---|---|
| 1,772,049 | Lake | Aug. 5, 1930 |
| 2,876,965 | Streib | Mar. 10, 1959 |

FOREIGN PATENTS

| | | |
|---|---|---|
| 985,498 | France | Mar. 14, 1951 |

OTHER REFERENCES

Flight Magazine (London), February 1957, pages 155 and 156.